United States Patent [19]

Omura et al.

[11] Patent Number: 5,367,830
[45] Date of Patent: Nov. 29, 1994

[54] ROOF-SIDE WEATHER STRIP FOR A MOTOR VEHICLE

[75] Inventors: Masayuki Omura; Seiji Ito, both of Inazawa, Japan

[73] Assignee: Toyoda Gosei Co., Ltd., Nishikasugai, Japan

[21] Appl. No.: 92,500

[22] Filed: Jul. 16, 1993

[30] Foreign Application Priority Data

Aug. 24, 1992 [JP] Japan ................... 4-247251
Apr. 19, 1993 [JP] Japan ................... 5-115360

[51] Int. Cl.$^5$ ............................................. E06B 7/16
[52] U.S. Cl. ...................... 49/475.1; 49/489.1; 49/498.1; 49/495.1
[58] Field of Search ............. 49/440, 441, 475.1, 49/489.1, 493.1, 495.1, 498.1

[56] References Cited

U.S. PATENT DOCUMENTS

| | | | |
|---|---|---|---|
| 4,667,442 | 5/1987 | Hiramatsu et al. | 49/489.1 |
| 4,769,947 | 9/1988 | Ogawa et al. | 49/498.1 |
| 4,957,301 | 9/1990 | Clay, Jr. et al. | 49/475.1 |
| 4,977,706 | 12/1990 | Kisanuki | 49/498.1 |
| 4,998,946 | 3/1991 | Nozaki . | |
| 5,056,850 | 10/1991 | Ketcherian et al. | 49/475.1 |
| 5,067,280 | 11/1991 | Arima | 49/498.1 |
| 5,111,617 | 5/1992 | Saiga | 49/475.1 |
| 5,127,193 | 7/1992 | Okada et al. | 49/495.1 |

Primary Examiner—Michael J. Milano
Attorney, Agent, or Firm—Cushman, Darby & Cushman

[57] ABSTRACT

A roof-side weather strip is provided to be attached along a front pillar of a motor vehicle. The weather strip has a base portion adapted to be engaged with the front pillar, and a tubular sealing portion projecting from a front end part of the base portion for closing a gap between the front pillar and a front end edge of the door frame. A rib-shaped projection is formed integrally with a bottom of the tubular sealing portion so as to project within the tubular sealing portion. In the lower end portion of the roof-side weather strip, the seal wall of the sealing portion is bonded to a top end of the rib-shaped projection so that the seal wall has a reduced height relative to that of the remaining portions thereof, and has a configuration conforming to the approaching track of the front end edge of the door frame when a door of the vehicle is closed.

4 Claims, 5 Drawing Sheets

ROOF-SIDE WEATHER STRIP FOR A MOTOR VEHICLE

BACKGROUND OF THE INVENTION

1. Field of the Invention

The present invention relates to a weather strip, and more particularly to a roof-side weather strip to be attached along a front pillar of a motor vehicle.

2. Description of Related Art

A roof-side weather strip (hereinafter merely called a weather strip) is attached along a roof-side of a motor vehicle including a front pillar, to provide a seal between a door opening of a vehicle body and a door frame, near a door glass of a door.

FIG. 1 illustrates a cross-section of a conventional weather strip which is attached along the front pillar. A weather strip 10 includes a band-shaped base portion 12, a sealing lip 14 projecting from a rear end part of the base portion 12, and a tubular sealing portion 16 projecting from a front end part of the base portion 12. A rear end of the base portion 12 is engaged with a retainer 18 which is secured to a front pillar 20 of a motor vehicle. A front end of the base portion 12 is engaged with a pillar molding 22 which is secured to the front pillar 20.

When a door is closed, a door frame 24 is sealed against the front pillar 20 by the sealing lip 14, which comes into elastic contact with the inner surface of the door frame 24. The gap between the front pillar 20 and a front end edge of the door frame 24 is closed by the sealing portion 16. Reference numeral 26 designates a windshield glass.

FIG. 2 illustrates a cross-section of another conventional weather strip. The sealing portion 17 projecting from a front end part of the base portion 12 of the weather strip 11 has a lip-like configuration, and extends upwardly from the base portion 12.

The conventional weather strips 10 and 11 of the above-described constructions respectively, exhibit the problem that the sealing portions 16 and 17 are worn away, particularly in the lower end portions thereof which face the lower end portion of the door frame 24. Thus, by the repetition of opening and closing of the door over a long period of time, the sealing portions 16 and 17 are likely to be broken.

SUMMARY OF THE INVENTION

It is an object of the present invention to provide a roof-side weather strip to be attached along a front pillar of a motor vehicle, which prevents a sealing portion that closes a gap between the front pillar and the front end edge of the door frame, particularly, the lower end portion of the sealing portion, from being worn away.

The present invention has been contemplated based on the fact that when the door is closed, the approaching direction of the door frame differs between the lower end portion of the weather strip than the remaining portions of the weather strip.

Namely, when the door is closed, the front end edge of the door frame comes into contact with the sealing portion. At this time, in the upper portion Of the weather strip, the front end edge of the door frame approaches the sealing portion from the outside of the vehicle, and presses the sealing portion toward the front pillar, whereas in the lower end portion of the weather strip, which is near the door hinge portion, the front end edge of the door frame approaches the sealing portion, following such an arc-shaped track as to thrust against the upper surface of the sealing portion. As a result, the sealing portion is worn away.

In accordance with the principles of the present invention, the sealing portion of the lower end of the weather strip has a reduced height relative to that of the remaining portions of the weather strip, and has a configuration which substantially conforms to the approaching track of the door frame.

In accordance with one feature of the invention, a rib-shaped projection is formed inside a tubular sealing portion of the extruded weather strip so as to integrally project from its bottom. The rib-shaped projection extends continuously in the longitudinal direction of the extruded weather strip. A top end of the rib-shaped projection is spaced apart from the seal wall of the tubular sealing portion. The seal wall of the tubular sealing portion is pressed on the top end of the projection and is bonded thereto only in the lower end portion of the extruded weather strip.

In accordance with another feature of the invention, in the lower end portion of the extruded weather strip having a tubular sealing portion, the rear side portion of the seal wall of the tubular sealing portion is pulled toward the base portion, and is bonded thereto.

In accordance with still another feature of the invention, a rib-shaped projection is integrally formed in the front end portion of the base portion of the extruded weather strip beneath a lip-like sealing portion thereof. The rib-shaped projection extends in the longitudinal direction of the weather strip. A top end of the rib-shaped projection is spaced from the lip-like sealing portion. The lip-like sealing portion is pressed on the top end of the projection and is bonded thereto only in the lower end portion of the weather strip.

In accordance with a further feature of the invention, in the lower end portion of the extruded weather strip having a lip-like sealing portion, an end edge of the lip-like sealing portion is bonded to the base portion.

In accordance with the principles of the present invention, in the lower end portion of the weather strip, the sealing portion has a height less than that of the remaining portions of the weather strip, and has a configuration which substantially conforms to the approaching track of the door frame when the door is closed. Accordingly, in the lower end portion of the weather strip, the door frame is prevented from being rubbed against the sealing portion and in the remaining portions of the weather strip, a sufficient amount of overlap between the door frame and the sealing portion is obtained.

Other objects, features and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Figure 1:
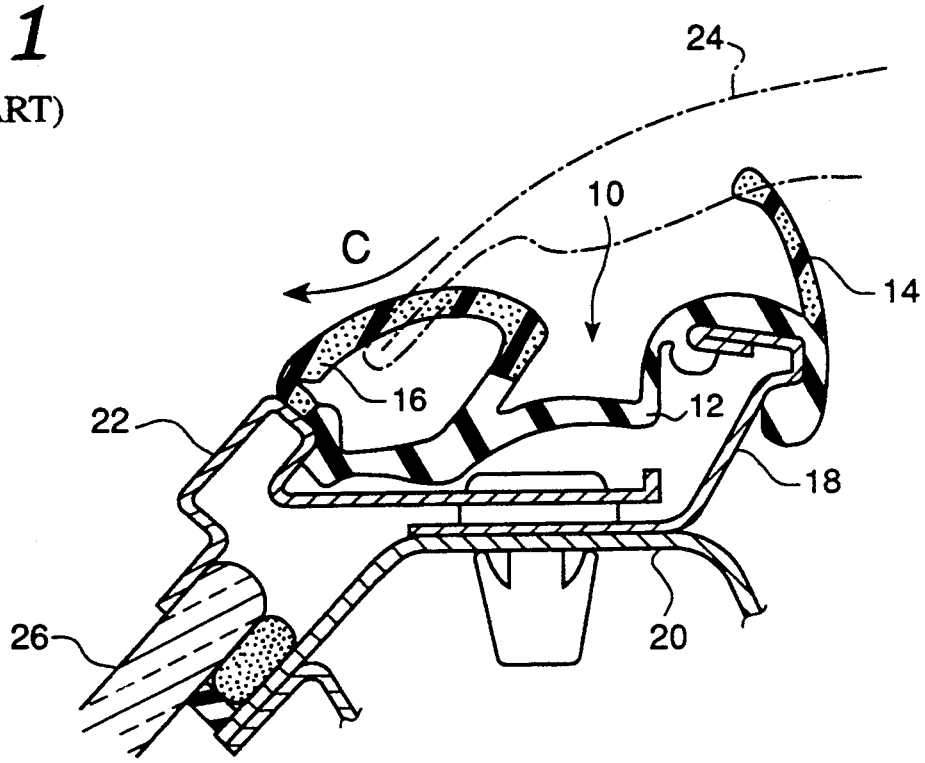
FIG. 1 is a cross-sectional view of a conventional roof-side weather strip.
Figure 2:
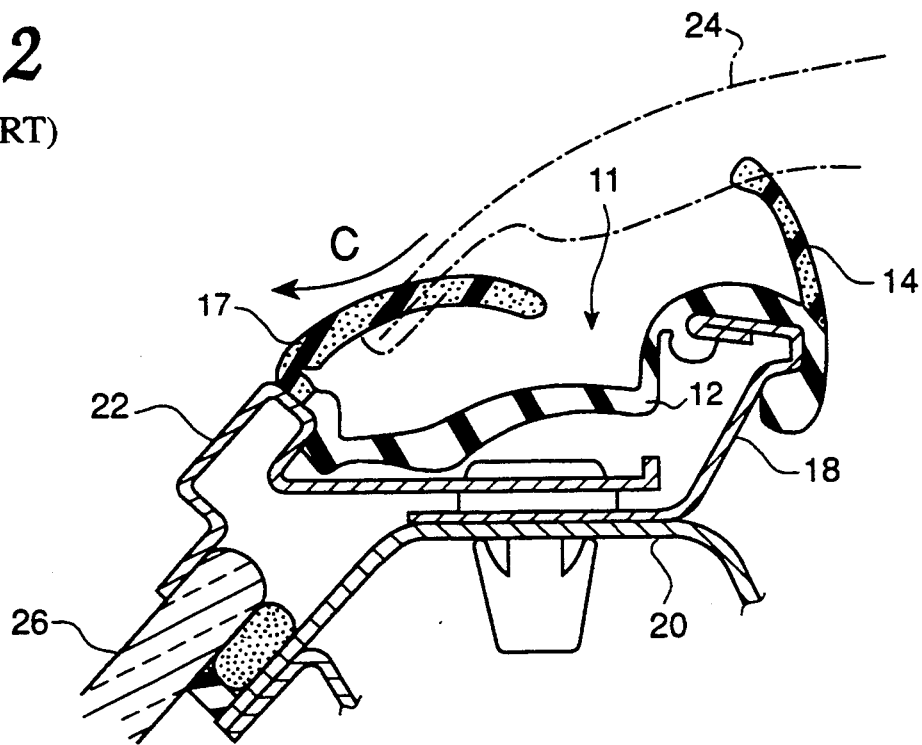
FIG. 2 is a cross-sectional view of another conventional roof-side weather strip.
Figure 3:
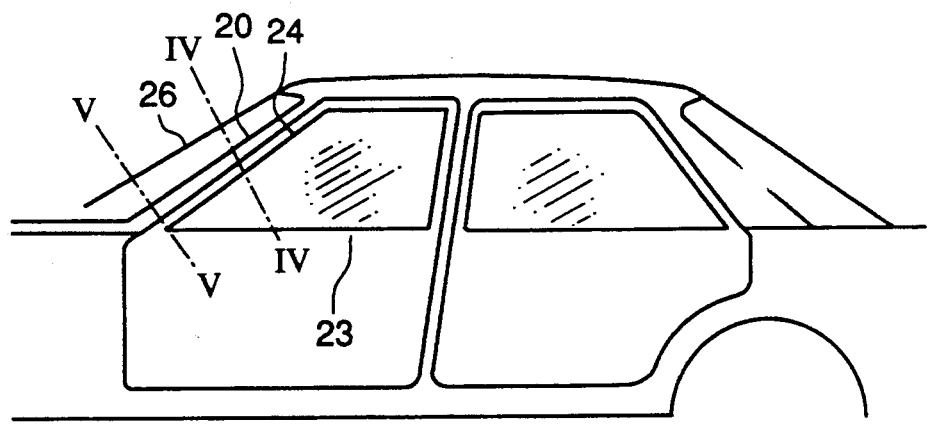
FIG. 3 is a side view of a conventional motor vehicle to which the weather strip of the present invention is applied.
Figure 4:
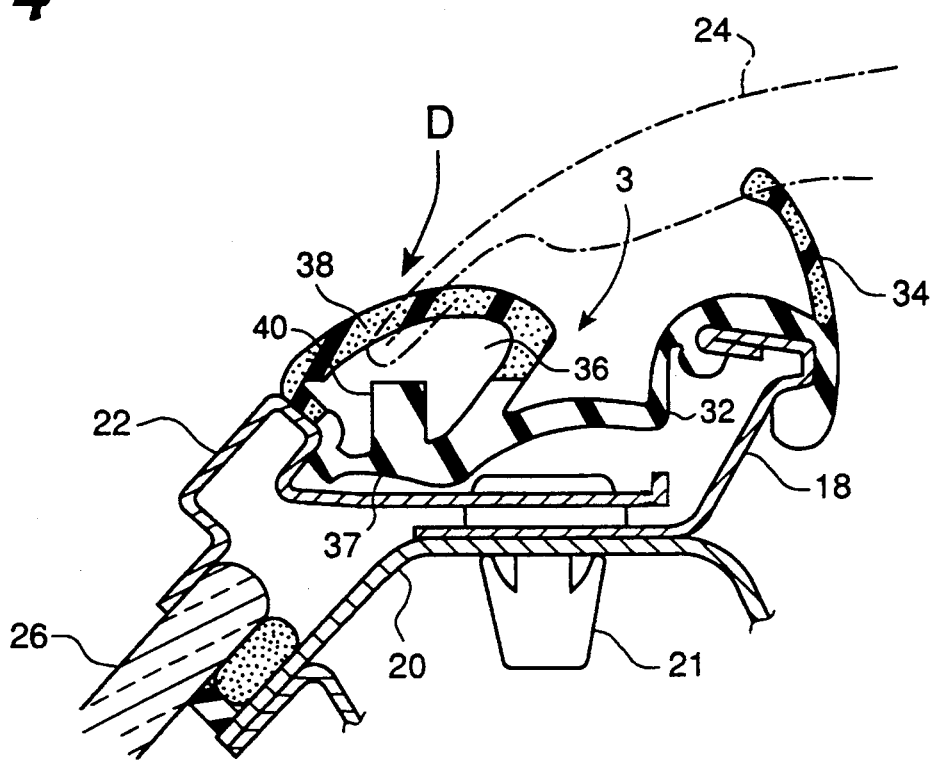
FIG. 4 is a cross-sectional view of a first embodiment of a roof-side weather strip provided in accordance with the principles of the present invention, taken along the line IV—IV of FIG. 3.
Figure 5:
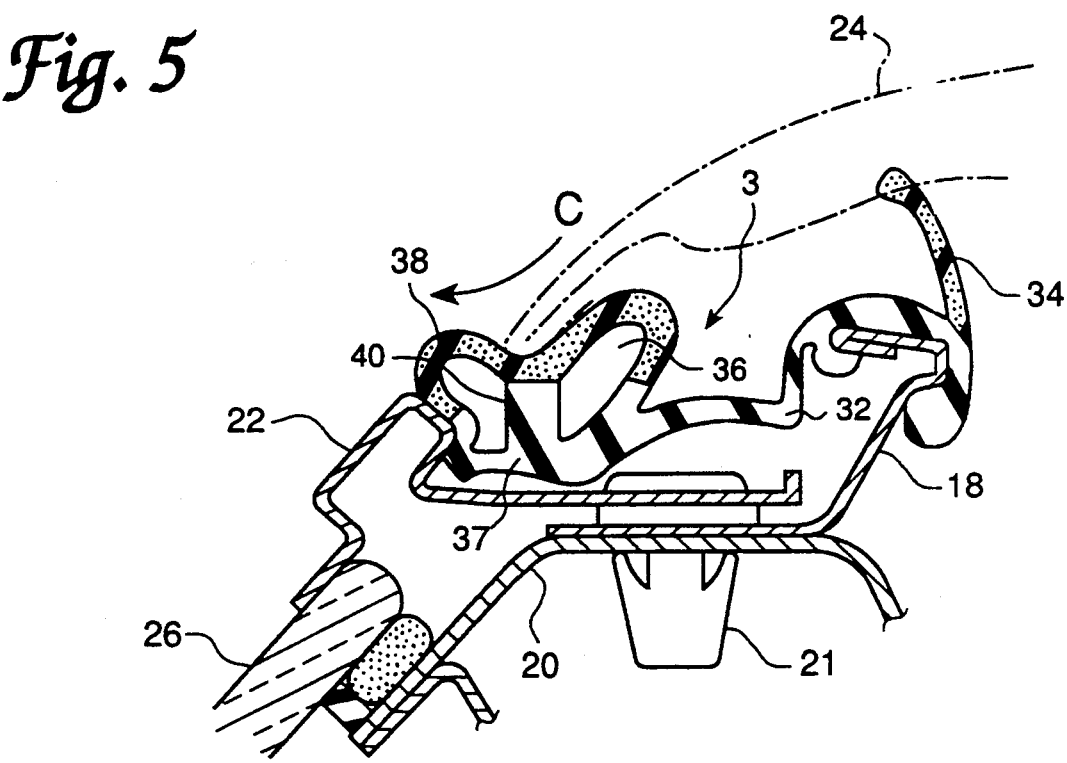
FIG. 5 is a cross-sectional view of the first embodiment of the weather strip, taken along the line V—V of FIG. 3.

FIGS. 4 and 5 illustrate a first embodiment of a roof-side weather strip provided in accordance with the principles of the present invention. FIG. 4 is a cross-sectional view of an upper portion of the weather strip, taken along the line IV—IV of FIG. 3, and FIG. 5 is a cross-sectional view of a lower end portion of the weather strip, taken along the line V—V of FIG. 3.

A weather strip 3 is composed of an extruded body, and includes a band-shaped base portion 32 extending along the vehicle front pillar 20, a sealing lip 34 projecting from the rear end part of the base portion 32, and a tubular sealing portion 36 projecting from the front end part of the base portion 32. The tubular sealing portion 36 has a bottom wall 37 which is integrally connected to the base portion 32, and a seal wall 38 of an arc-shaped cross-section, which expands outwardly from the bottom wall 37. The base portion 32 and the bottom wall 37 are made of solid rubber, whereas the remaining portions of the weather strip 3 are made of sponge rubber.

A retainer 18 and a pillar molding 22 are secured to the front pillar 20 by a clip 21. A rear end of the base portion 32 is engaged with the retainer 18 while the bottom wall 37 of the tubular sealing portion 36 is disposed in the concave portion of the pillar molding 22. Reference numeral 26 designates a windshield glass.

A rib-shaped projection 40 is formed on the bottom wall 37 so as to project toward the seal wall 38 of the tubular seal portion 36. The projection 40 extends continuously in the longitudinal direction of the weather strip 3. An upper end of the projection 40 is spaced from the opposed inner surface of the seal wall 38. The projection 40 is formed during the extruding of the weather strip 3.

As shown in FIG. 5, in the lower end portion of the weather strip 3, which extends approximately 70 to 80 mm upwardly from the door belt line 23 (FIG. 3), the seal wall 38 of the tubular sealing portion 36 is pressed onto the top end of the projection 40, and is bonded thereto by a suitable adhesive. As a result, the seal wall 38 of the tubular sealing portion 36 is depressed at its width-wise center, and accordingly has a shallow V-shaped cross-section.

Thus, in the lower end portion of the weather strip 3, the height of the tubular sealing portion 36 is reduced relative to that of the remaining portions thereof, and the seal wall 38 of the-tubular sealing portion 36 has a configuration which substantially conforms to the track of the front end edge of the door frame 24 when the door is closed. The direction of movement of the door frame is shown by the arrow C in FIG. 5. As a result, the front end edge of the door frame 24 sufficiently laps the seal wall 38 of the weather strip, in the lower end portion thereof, and the front end edge of the door frame 24 is prevented from being rubbed against the tubular sealing portion 36. Accordingly, the tubular sealing portion 38 is prevented from being worn away.

In the upper portion of the weather strip 3, the seal wall 38 is pressed by the door frame 24 in the direction of the arrow D shown in FIG. 4.

Figure 6:
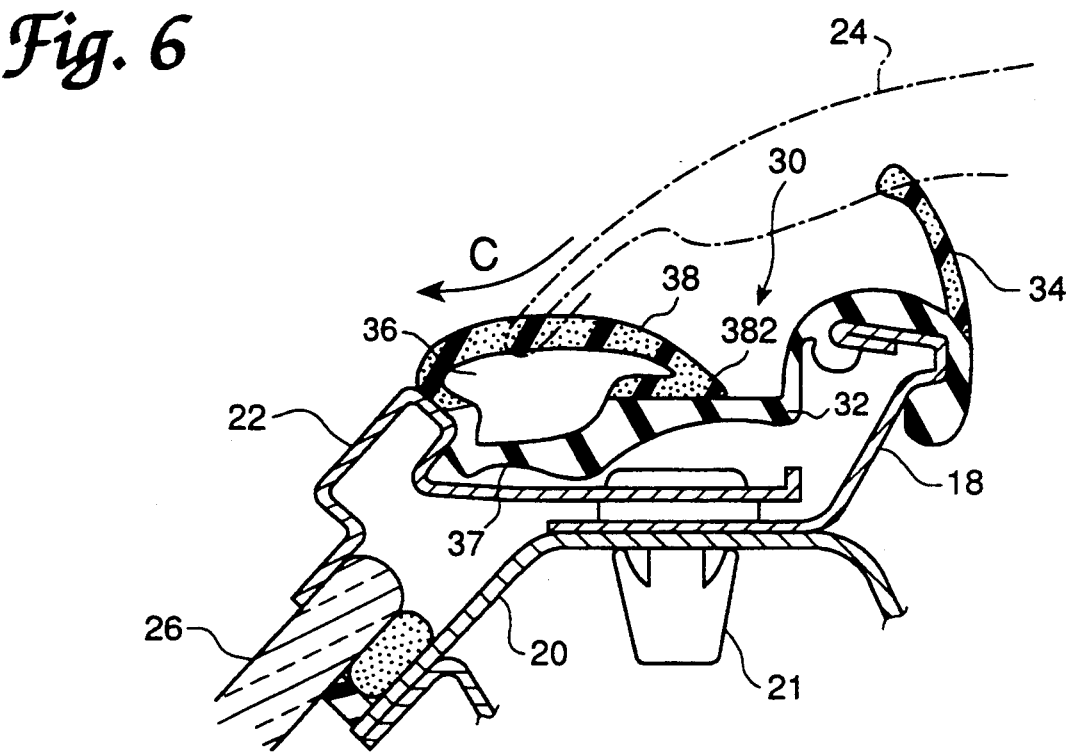
FIG. 6 is a cross-sectional view of a second embodiment of a roof-side weather strip provided in accordance with the principles of the present invention, taken along the line V—V of FIG. 3.

FIG. 6 illustrates a lower end portion of a second embodiment of a weather strip 30 provided in accordance with the principles of the present invention. As shown, the weather strip 30 has no rib-shaped projection. Other configurations of the weather strip 30 are identical to that of the first embodiment, except for the lower end portion thereof.

In accordance with the present embodiment, in the lower end portion of the weather strip 30, a rear side portion 382 of the seal wall 38 is pulled toward the base portion 32, and is bonded thereto. As a result, the seal wall 38 of the tubular sealing portion 36 becomes substantially flat, and is brought into a position that is lower than that of the remaining portions. In FIG. 6, parts similar to those in the first embodiment illustrated in FIGS. 4 and 5 are given the same reference numerals as in FIGS. 4 and 5. The second embodiment also achieves substantially the same operational advantages as those of the first embodiment.

Figure 7:
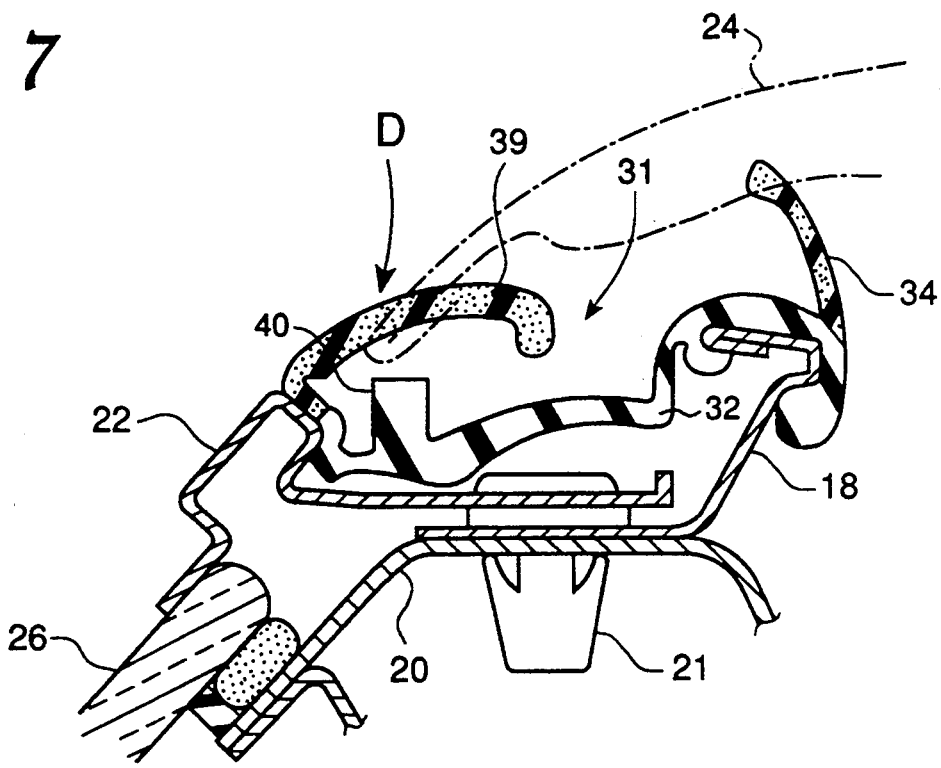
FIG. 7 is a cross-sectional view of a third embodiment of a roof-side weather strip provided in accordance with the principles of the present invention, taken along the line IV—IV of FIG. 3.
Figure 8:
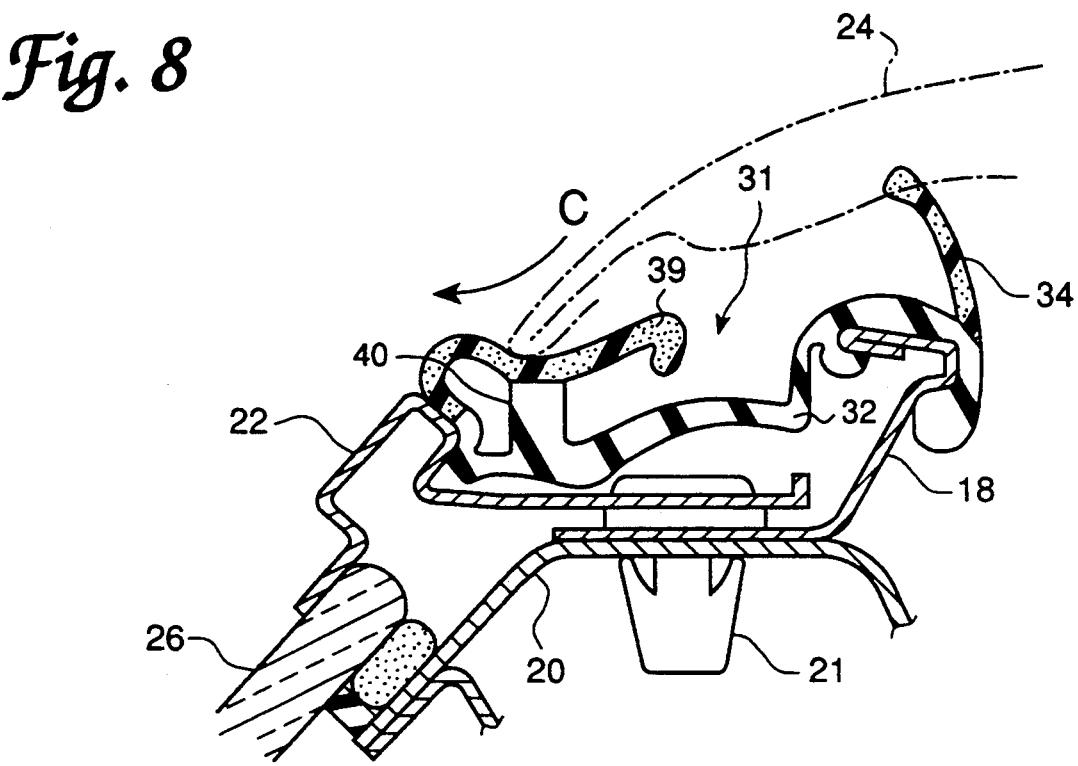
FIG. 8 is a cross-sectional view of a third embodiment of a weather strip, taken along the line V—V of FIG. 3.

FIGS. 7 and 8 illustrate a third embodiment of a roof-side weather strip provided in accordance with the principles of the present invention. FIG. 7 is a cross-sectional view of an upper portion of the weather strip, taken along the line IV—IV of FIG. 3, and FIG. 8 is a cross-sectional view of a lower end portion of the weather strip, taken along the line V—V of FIG. 3. In FIGS. 7 and 8, parts similar to those in the first embodiment illustrated in FIGS. 4 and 5 are given the same reference numerals as in FIGS. 4 and 5.

A weather strip 31 is composed of an extruded body and includes a band-shaped base portion 32, a sealing lip 34 projecting from the rear end part of the base portion 32, and a lip-like sealing portion 39 having an arc-shaped cross-section, extending from the front end part of the base portion 32 to the upper side of the base portion 32. An end edge of the lip-like sealing portion 39 is slightly bent inwardly of a vehicle body.

A rib-shaped projection 40 is formed on the front end portion of the base portion 32 so as to project toward the lip-like sealing portion 39. The projection 40 extends continuously in the longitudinal direction of the weather strip 31. An upper end of the projection 40 is spaced from the opposed inner surface of the lip-like sealing portion 39.

A rear end of the base portion 32 of the weather strip 31 is engaged with the retainer 18 while the front end of the base portion 32 is disposed in the concave portion of the pillar molding 22.

When the door is closed, the sealing lip 34 comes into elastic contact with the inner surface of the front portion of the door frame 24, and the lip-like sealing portion 39 is pressed by the front end edge of the door frame 24.

As shown in FIG. 8, in the lower end portion of the weather strip 31, the width-wise middle portion of the lip-like sealing portion 39 is pressed onto the top end of the projection 40, and is bonded thereto by a suitable adhesive. As a result, the lip-like sealing portion 39 has a shallow V-shaped cross-section, and accordingly, the height thereof is reduced relative to that of the remaining portions.

When the door is closed, the lip-like sealing portion 39 is prevented from being worn away, since the front end edge of the door frame 24 approaches the lower end portion of the weather strip 31 following the track along the lip-like sealing portion 39, as shown by the arrow C in FIG. 8.

Figure 9:
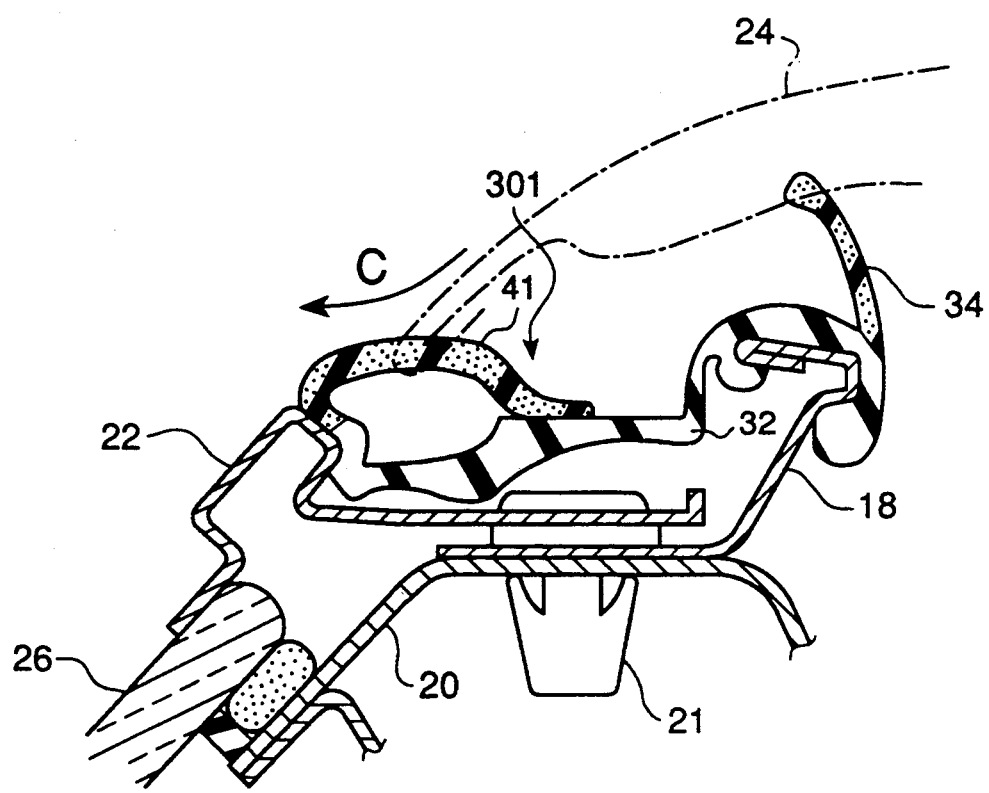
FIG. 9 is a cross-sectional view of a fourth embodiment of a roof-side weather strip provided in accordance with the principles of the present invention, taken along the line V—V of FIG. 3.

FIG. 9 illustrates a lower end portion of a fourth embodiment of a weather strip provided in accordance with the principles of the present invention. The upper portion of the weather strip 301 is identical to that of the third embodiment shown in FIG. 7, except that no projection is formed in the base portion 32.

In accordance with the present embodiment, in the lower end portion of the weather strip 301, an end edge of the lip-like sealing portion 41 is bonded to the base portion 32 while being pulled toward the base portion 32. As a result, the lip-like sealing portion 41 becomes substantially flat, and is disposed at a position that is lower than that of the remaining portions.

The fourth embodiment also achieves substantially the same operational advantages as those of the preceding embodiments.

As described above, in accordance with the principles of the present invention, by decreasing the height of the sealing portion only in the lower end portion of the weather strip, the door frame can be prevented from being rubbed against the sealing portion when the door is closed. Accordingly, the sealing portion can be prevented from being worn away and broken.

While the invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A weather strip adapted to be attached along a front pillar of a motor vehicle to provide a seal between the front pillar and a front portion of a door frame of the motor vehicle, the weather strip comprising:
   a base portion adapted to be engaged with the front pillar; and
   a tubular sealing portion which projects from a front end part of said base portion for closing a gap between the front pillar and a front end edge of the front portion of the door frame;
   said base portion and said tubular sealing portion being extrusions, said tubular sealing portion having a rib-shaped projection which projects from a bottom thereof, and extends in a longitudinal direction of the weather strip so that a top end of said rib-shaped projection is spaced from a seal wall of said tubular sealing portion, and in a lower end portion of said weather strip, said seal wall being pressed on and bonded to said top end of said rib-shaped projection, whereby in said lower end portion of said weather strip, said seal wall has a reduced height relative to that of the remaining portions thereof, and has a configuration which substantially conforms to an approaching track of the front end edge of the front portion the door frame so as to minimize contact with the front end edge of the door frame upon closing a door of the motor vehicle.

2. The weather strip according to claim 1, wherein said lower end portion of said roof-side weather strip extends approximately 70 to 80 mm upwardly from a door belt line, when the whether strip is coupled to the motor vehicle.

3. A weather strip adapted to be attached along a front pillar of a motor vehicle to provide a seal between the front pillar and a front portion of a door frame of the motor vehicle, the weather strip comprising:
   a base portion adapted to be engaged with the front pillar; and
   a lip-like sealing portion which extends from said front end part of said base portion toward an upper side of said base portion;
   said base portion and said lip-like sealing portion being extrusions, a rib-shaped projection being formed in a front end portion of said base portion toward said lip-like sealing portion so as to extend in a longitudinal direction of the weather strip, a top end of said projection being spaced from said lip-like sealing portion, and in a lower end portion of said weather strip, said lip-like sealing portion being pressed on and bonded to said top end of said projection, whereby, in said lower end portion of said weather strip, said lip-like sealing portion has a reduced height relative to that of the remaining portions thereof, and has a configuration which substantially conforms to an approaching track of the front end edge of the front portion of the door frame so as to minimize contact with the front end edge of the door frame upon closing a door of the motor vehicle.

4. The weather strip according to claim 3, wherein said lower end portion of said roof-side weather strip extends approximately 70 to 80 mm upwardly from a door belt line, when the weather strip is coupled to the motor vehicle.

* * * * *